US010003851B2

(12) United States Patent
Fisher et al.

(10) Patent No.: US 10,003,851 B2
(45) Date of Patent: Jun. 19, 2018

(54) MANAGED MULTIPLEXING OF VIDEO IN AN ADAPTIVE BIT RATE ENVIRONMENT

(75) Inventors: Yuval Fisher, Palo Alto, CA (US); Adam S. Tom, San Francisco, CA (US)

(73) Assignee: Imagine Communications Corp., Frisco, TX (US)

( * ) Notice: Subject to any disclaimer, the term of this patent is extended or adjusted under 35 U.S.C. 154(b) by 815 days.

(21) Appl. No.: 12/949,957

(22) Filed: Nov. 19, 2010

(65) Prior Publication Data
US 2011/0126248 A1 May 26, 2011

Related U.S. Application Data

(60) Provisional application No. 61/281,993, filed on Nov. 24, 2009.

(51) Int. Cl.
*H04N 21/262* (2011.01)
*H04N 21/2662* (2011.01)
(Continued)

(52) U.S. Cl.
CPC ... *H04N 21/47202* (2013.01); *H04N 7/17318* (2013.01); *H04N 21/2365* (2013.01);
(Continued)

(58) Field of Classification Search
CPC ..... H04L 65/4084; H04L 67/06; H04L 43/16; H04L 47/2416; H04L 47/38;
(Continued)

(56) References Cited
U.S. PATENT DOCUMENTS 6,023,725 A * 2/2000 Ozawa et al. ............... 709/219
6,738,427 B2 * 5/2004 Zetts ..................... 375/240.28
(Continued)

FOREIGN PATENT DOCUMENTS

CN 1460378 12/2003
CN 101252689 8/2008

OTHER PUBLICATIONS

Pantos & May, 'HTTP Live Streaming', Nov. 19, 2010, 23 pages, [retrieved on Jan. 18, 2011]. Retrieved from the Internet: <URL: http://tools.ietf.org/html/draft-pantos-http-live-streaming-05>.

(Continued)

*Primary Examiner* — Benjamin R Bruckart
*Assistant Examiner* — Jen-Shi Huang
(74) *Attorney, Agent, or Firm* — Tarolli, Sundheim, Covell & Tummino LLP

(57) ABSTRACT

Methods and apparatus for delivering video programs are provided. A plurality of video programs are provided in a fragmented, adaptive bit rate format. A request for a respective video program from the plurality of video programs is received from each of a plurality of clients. The requested video programs are multiplexed for delivery to the clients in a multiplex over a shared, fixed-bit-rate transmission channel. The requests may be for the same or different video programs. The requests for the video programs may occur at the same or at different times. In the fragmented, adaptive bit rate format, the fragment delivered to the client may not be the same as the requested fragment and is dependent on multiple criteria, including the bitrate and quality of the requested and delivered fragments, the total available delivery bandwidth, and other fragment requests made on the channel. The resulting multiplex may be either a constant bit rate multiplex or a variable bit rate multiplex.

27 Claims, 7 Drawing Sheets

(51) Int. Cl.
*H04N 21/434* (2011.01)
*H04N 21/2365* (2011.01)
*H04N 21/472* (2011.01)
*H04N 7/173* (2011.01)

(52) U.S. Cl.
CPC ... *H04N 21/2662* (2013.01); *H04N 21/26216* (2013.01); *H04N 21/4347* (2013.01)

(58) Field of Classification Search
CPC ......... H04N 21/23608; H04N 21/2381; H04N 21/26216; H04N 21/2662; H04N 21/47202; H04N 21/8456; H04N 21/64738; H04N 21/2365; H04N 21/4347; H04N 7/17318; H04W 28/0231; H04W 28/24
USPC ......... 725/34, 74, 109; 714/25, 43; 380/285; 709/230, 232, 233, 238, 231; 375/240.28, 375/240.02
See application file for complete search history.

(56) References Cited

U.S. PATENT DOCUMENTS

| | | | |
|---|---|---|---|
| 6,931,059 B1* | 8/2005 | Van Dusen et al. | 375/240.02 |
| 6,996,129 B2 | 2/2006 | Krause et al. | |
| 7,028,096 B1* | 4/2006 | Lee | 709/231 |
| 7,046,677 B2 | 5/2006 | Monta et al. | |
| 7,804,856 B2 | 9/2010 | Krause et al. | |
| 7,991,904 B2* | 8/2011 | Melnyk et al. | 709/230 |
| 8,107,524 B2 | 1/2012 | Laksono | |
| 2002/0140851 A1 | 10/2002 | Laksono | |
| 2002/0152317 A1* | 10/2002 | Wang et al. | 709/231 |
| 2006/0193380 A1 | 8/2006 | Laksono | |
| 2008/0052414 A1* | 2/2008 | Panigrahi et al. | 709/246 |
| 2008/0098124 A1* | 4/2008 | Vaughan et al. | 709/231 |
| 2010/0189183 A1* | 7/2010 | Gu et al. | 375/240.28 |
| 2010/0299552 A1* | 11/2010 | Schlack et al. | 714/4 |
| 2011/0246659 A1* | 10/2011 | Bouazizi | 709/231 |
| 2013/0298170 A1* | 11/2013 | ElArabawy et al. | 725/62 |

OTHER PUBLICATIONS

'Smooth Streaming', Microsoft Corporation IIS web site, date unknown, 3 pages, [retrieved on Jan. 20, 2011]. Retrieved from the Internet: <URL: http://www.iis.net/download/SmoothStreaming>.

'Statistical Multiplexing—Multiplex Usage Chart', author unknown, date unknown, 4 pages, [retrieved on Jan. 18, 2011]. Retrieved from the Internet: <URL: http://igorfuna.com/dvb-t/slovenia/multiplex-a-usage-chart>.

Changuel, N., et al., 'Predictive Control for Efficient Statistical Multiplexing of Digital Video Programs', date unknown, 9 pages, [retrieved on Jan. 18, 2011]. Retrieved from the Internet: <URL: http://research.microsoft.com/en-us/um/redmond/events/pv2009/papers/session_congestion_control/paper%2036.pdf>.

* cited by examiner

US 10,003,851 B2

MANAGED MULTIPLEXING OF VIDEO IN AN ADAPTIVE BIT RATE ENVIRONMENT

This application claims the benefit of U.S. Provisional Patent Application No. 61/281,993, filed Nov. 24, 2009, which is incorporated herein and made a part hereof by reference.

BACKGROUND OF THE INVENTION

The present invention relates to the processing of digital video signals, and more particularly to the multiplexing of digital video programs in an adaptive bit rate environment for transmission over a fixed-bit-rate transmission channel.
Statistical Multiplexing:

Today video service providers, such as cable television operators, direct broadcast satellite companies, and over-the-air digital television broadcasters, transmit digitally compressed video either in a Constant Bit Rate (CBR) form or in a Variable Bit Rate (VBR) form using the MPEG-2 Transport Stream protocol.

If CBR compression and transmission is used, as illustrated in FIG. 1, then a video program is compressed such that the bit rate (in bits per second) of the compressed video program is constant over time throughout the length of the video program. When sending multiple CBR-compressed video programs over a transmission channel, the video service provider sends as many video programs (e.g., programs 1-4) over the channel as possible, such that the sum of all the bit rates of the CBR-compressed video programs is less than the bandwidth of the channel measured in bits per second. CBR compression and transmission is easy to manage, but it is not the most efficient means of sending video over a fixed-rate transmission channel if the goal is to maximize the picture quality of all of the transmitted video programs that are sent over the transmission channel. With CBR compression, while the bit rate is constant, the rendered picture quality of the video program can vary over time.

An alternative method of compression and transmission is to employ VBR compression and statistical multiplexing for transmission. Today video service providers almost universally employ this method of transmission in order to maximize the video quality they offer their subscribers across their multichannel video service.

With VBR compression, nearly constant picture quality over time for a video program can be achieved while letting the bit rate of the compressed video program vary over time. The bit rate varies over time because easy scenes (such as low-detail or slow action scenes) in the video program require less bits to compress to a pre-determined target picture quality while hard scenes (such as high-detail and fast action scenes) take more bits to compress to a pre-determined target picture quality. These "peaks" and "valleys" in bit rate fluctuate over time depending upon the content of the video program. Note that for a CBR-compressed video program, its constant bit rate equals its average bit rate. When compressed at an average bit rate equal to its CBR-compressed version, the VBR-compressed video program achieves higher picture quality, because VBR compression allows the bit rate to peak when needed in order to render hard scenes at the target picture quality, while expending less bits for easy scenes so as not to use more bits than necessary to render the target picture quality.

Also, the location of the "peaks" and "valleys" in the bit rate of one video program are typically uncorrelated with those of another video program, and thus, generally the "peaks" and "valleys" do not align in time from one video program to another. Therefore, the idea of statistical multiplexing is to control where the "peaks" and "valleys" of multiple VBR programs occur and then to combine them into a fixed rate channel in such a way that the "valleys" of some video programs will "absorb" the "peaks" of other video programs, and hence, deliver higher picture quality for all the programs, as compared with using CBR compression, where the constant bit rate is equal to the average bit rate of each of the VBR-compressed versions.

The implementation of statistical multiplexing must make sure, however, to fit all the VBR-compressed video programs into the fixed rate channel since there is no guarantee that all the "valleys" will absorb all the "peaks" perfectly. There will be instances where the aggregate sum of all the VBR-compressed video programs that are sent in a fixed-rate channel want to exceed the fixed rate of the channel. Hence, an implementation of statistical multiplexing needs some way of reducing the bandwidth at any instance in time to make sure that the aggregate sum is less than or equal to the fixed rate of the channel.

Today, video service providers statistically multiplex compressed video programs that they receive from various sources using a statistical multiplexer as in FIG. 2. The output of the statistical multiplexer is a statistical multiplex of video programs which is delivered over the "last mile" of a video service provider's distribution network to the receiving and decoding device (or client) in the home. In implementing statistical multiplexing, video service providers employ Transrating or Transcoding to reduce the bandwidth of a video program at any instance in time.

In statistical multiplexing:
a. Various sources (e.g. sources 1-4) of compressed video (for example, satellite receivers, over-the-air receivers, video encoders that compress baseband video, and video servers) stream or push CBR-compressed and/or VBR-compressed video programs to the statistical multiplexer 10;
b. The pushed video programs are in the form of transport streams. An example of such a transport stream is the MPEG-2 transport stream described in the MPEG-2 Systems specification ISO/IEC 13818. Transport streams, among other things, contain strict timing information and must be delivered or streamed to the multiplexer 10 in strictly timed packets of data;
c. Because the video programs are pushed to the statistical multiplexer 10, the statistical multiplexer 10 is a slave to the sources of video and takes whatever the source provides to it;
d. Transrating can change the compressed bit rate of a video program by various methods, depending upon the manufacturer of the product. It can employ such techniques as changing the quantization level of the compressed video program. Transrating can not only lower the bit rate of a VBR-compressed video program at any instant in time, but can also convert CBR-compressed video programs to VBR-compressed versions;
e. Transcoding involves decoding the video back to its uncompressed format (or ingesting it in this format) and then re-encoding it while controlling the output bitrate under the control of the statistical multiplexer 10;
f. When performing statistical multiplexing, multiple streams (for example, N streams) are streamed or pushed from their sources to the statistical multiplexer 10. The statistical multiplexer 10 combines the streams together and, with the aid of Transrating or Transcoding, either 1) reduces the bit rate of one or more VBR-compressed streams, when needed, to fit all the streams into the fixed-rate output channel or 2) converts the CBR streams into VBR streams and makes sure that all the streams fit within the fixed-rate output channel 12.

For example, one could send ten 4 Mbit/sec CBR-compressed video programs in a 40 Mbit/sec channel. Alternatively, one could send ten VBR-compressed video programs over a 40 Mbit/sec channel where the average bit rate of each VBR-compressed video program is 4 Mbits/sec. The result is that the picture quality of each of the VBR-compressed video programs will have a more constant and higher picture quality than the CBR-compressed video programs. The employment of statistical multiplexing is desirable for video service providers who want to deliver the highest picture quality in a given amount of bandwidth.

Adaptive Video Delivery:

Adaptive video delivery is a recent technique popularized by technology providers such as Apple, Microsoft and Adobe and employed by Internet video service providers (such as abc.com, Netflix, Fancast.com, etc.) to enable the delivery of uninterrupted video (i.e., without glitches, stops and starts, and pauses) over unmanaged networks, such as those provided by cable operators and telephone companies for normal high-speed data service, which are what people connect over today when watching video over the Internet.

Adaptive video delivery is different from traditional video streaming and transmission techniques used today. Today's video streaming over cable, satellite, over-the-air television, and DVDs utilize a continuous string of data called a Transport stream (such as the MPEG-2 Transport Stream protocol) that contains the compressed video information for the entire video program, as well as timing information used for decoding and the maintenance of strict timing of the delivery of the data to the client or decoder, in one long, continuous file. This transport stream is pushed from the source to the client with the strict timing of the delivery of the data maintained along the transmission path.

In adaptive video delivery:
a. As illustrated in FIG. 3, several versions (e.g., A-E) of a video program 18 are created where each version is the result of compressing the video program 18 at each of several pre-determined constant bit rates. For example a video program can be compressed at 500 Kbits/sec, 750 Kbits/sec, 1 Mbit/sec, 1.25 Mbits/sec, etc. creating a version for each bit rate. Each version A-E is a bit-rate profile of the original video program.
b. CBR compression is used today for each of the different versions or profiles, but VBR compression could also be used.
c. Each version or profile is divided into smaller files, called fragments or chunks 20, where each fragment 20 corresponds to a fixed amount of playback time, for example 2 seconds, as shown in FIG. 3.
d. As shown in FIG. 4, each profile A-E, in its fragmented-file form, is stored on a video server 22 and grouped together with the other profiles for the video program 18.
e. When a client 24 requests a video program 18, instead of the source pushing the entire transport stream of the video program 18 to the client, the client issues a request to the video server for a first fragment 20 of a specific profile or its corresponding bit-rate. In other words, the client 24 pulls the video packets from the source (server 22) one fragment 20 at a time.
f. Once it receives and decodes this first fragment, the client 24 then asks for the next fragment 20 in time but it can ask for this next fragment 20 from any of the bit rate profiles A-E. For example, after receiving the first fragment 20 from the 1 Mbit/sec profile, the client 24 could ask for the second fragment 20 in time from the 750 Kbit/sec profile.
g. What determines the profile from which the client 24 should request the next fragment 20 is the local condition of the client 24, which can be things like its computational load or, most commonly, the bandwidth given by the network to the client 24 on the previous request. The bandwidth given by the network at any instance in time can vary over time because of network conditions such as congestion. Therefore, the idea is to match the bit-rate profile of the video program 18 at any 2-second instant in time to the bandwidth given to the client 24 at that instant in time, thus providing glitch-free and pause-free viewing of the video program 18. The client 24 has a narrow view of the bandwidth given to it based upon the how long it takes a fragment to download. For example, if a client 24 requests a fragment 20 from a particular profile A-E and it takes longer than the playback time of the fragment 20 (2 seconds for example) to download, then on the next request, the client 24 will ask for a fragment 20 from then a lower bit rate profile A-E. The opposite will also happen, and if it takes the same amount of time as the playback time of the fragment 20 to download, then the client 24 will request its next fragment 20 from the profile it requested its previous fragment from.
h. This process of subsequent requesting for the next fragment 20 in time from any of the profiles continues until the video program 18 is fully viewed or until the client 24 stops requesting.
i. It should be noted that unlike streaming, in adaptive video delivery the server holds no state information for the client-server pair, while the client holds all the state information for the client-server pair (e.g. video is in a 'play' state or in a 'paused' state).

Unlike statistical multiplexing of video today, where the goal is to maximize the video picture quality across multiple video programs that are pushed to the statistical multiplexer and delivered simultaneously in a fixed rate channel, the goal of adaptive video delivery is to deliver a glitch free viewing experience over a channel of varying bandwidth for a single client and video program.

Traditional video service providers such as cable companies are looking at using adaptive streaming techniques to deliver video on their networks instead of using traditional MPEG-2 transport streaming.

With today's transport streaming techniques such as MPEG-2 transport streaming, video service providers are able to maintain a high quality viewing experience of the video programs. This is due to management of the bandwidth assigned to any video program at any given instant in time using, for example, statistical multiplexing during the transrating or encoding process. Such management maximizes the video quality across all of the video programs in a fixed-bandwidth transmission channel and provides a seamless video experience for the viewer.

On the other hand, adaptive video delivery allows video service providers to take advantage of standard off the shelf data servers, open Internet-Protocol (IP) solutions, a common content management system across multiple video delivery platforms, and the faster innovation cycles of the Internet. However, adaptive video delivery solutions are only geared toward managing the delivery of a single program to a single user without knowledge of the bandwidth consumed by or delivery decisions made by other users in the same transmission channel. Also, these decisions are not based upon knowledge that there are multiple video programs in the transmission channel, knowledge of the bandwidth requested by all users, knowledge of the instantaneous quality level of each video program being requested, nor the target goal to maximize picture quality across multiple video programs simultaneously, for example.

As such, there is a need to apply multiplexing techniques to adaptive video delivery so that video service providers can not only take advantage of the benefits of adaptive video delivery techniques but also be able to maximize and manage picture quality across multiple video programs when delivering multiple video programs within a fixed-bit-rate transmission channel. That is, the multiplexing techniques make use of the aforementioned knowledge in order to optimize the delivery of the group of video stream over the delivery channel, rather than optimizing the delivery of just one video stream.

The present invention satisfies this need and provides the foregoing and other advantages.

SUMMARY OF THE INVENTION

The present invention relates to methods and apparatus for multiplexing digital video programs in an adaptive bit rate environment for delivery over a fixed-bit-rate transmission channel.

In one example embodiment of the present invention, a video delivery method is provided. A plurality of video programs are provided in a fragmented, adaptive bit rate format. A request for a respective video program from the plurality of video programs is received from each of a plurality of clients. The requested video programs are multiplexed for delivery to the clients in a multiplex over a shared, fixed-bit-rate transmission channel.

The requests may be for the same or different video programs. The requests for the video programs may occur at the same or at different times.

The video programs may be stored on or provided via a server.

In the fragmented, adaptive bit rate format, several versions of each video program may be provided at correspondingly different bit rates. Each version of each program may be divided into fragments.

The server may be an HTTP server. The requests may comprise HTTP requests for the fragments of the respective video programs requested by each of the clients.

In a further example embodiment, an HTTP proxy may be provided for receiving the HTTP requests from the clients and for providing the fragments of the respective video programs from the HTTP server to the clients in the multiplex over the fixed-bit-rate transmission channel.

The HTTP proxy may be one of a script, service, or process running on the same device as the HTTP server providing the video programs.

Each request may include an identification of the video program requested and a desired bit rate for an initial or next fragment of the requested video program. The HTTP proxy may return at least one fragment of the requested video program to the client at the desired bit rate or may return at least one fragment with a different bit rate based on predetermined criteria. The predetermined criteria may comprise at least one of: a number or type of other video programs are being requested in the same fixed-bit-rate transmission channel by other clients; an identity of the requesting client; a subscription plan of the requesting client; video quality levels of other video programs; a combined bandwidth being requested by all clients; a desired bandwidth or video quality set by a service provider providing the transmission channel; a predetermined fixed bit rate set by the service provider; and instantaneous bit rates of the other video programs, or the like.

For each client and the respective requested video program: each request may result in the receipt of at least one fragment of the video program; subsequent requests may be sent by the client and processed by the HTTP proxy after receipt of a prior request; and a bit rate of subsequent received fragments may be dependent on one of the corresponding request, the bit rate of a prior received fragment, or the predetermined criteria.

The client may comprise one of an end user or a content distribution network. In the event the HTTP proxy delivers the fragment with a different bit rate than requested, the HTTP proxy may include information specifying a change in the bit rate of the delivered fragment.

In a further example embodiment of the present invention, the multiplex may comprise a constant bit rate multiplex. For each client and the respective requested video program: each request may result in the receipt of at least one fragment of the video program; subsequent requests may be sent by the client and processed by the HTTP proxy after receipt by the client of a prior request until the entire video program or a desired portion of the video program is received; each fragment of the respective video program may be selected from one version of the video program and provided at the corresponding bit rate.

The bit rate of the fragments for each requested video program may be set by a service provider so that all requested video programs fit within the fixed-bit-rate transmission channel.

In another example embodiment of the present invention, the multiplex may comprise a variable bit rate multiplex. For each requested program, the HTTP proxy may monitor a quantization level of the fragments of each version of the requested program, and in response to each request, the HTTP proxy may deliver to the clients fragments taken from one or more of the versions of each program having the same or substantially the same quantization level. Each request may be processed by the HTTP proxy to determine when to provide a next fragment. Any indication of a desired bit rate contained in the client request may be ignored by the HTTP proxy, as instead, with the variable bit rate embodiment, the bit rate of all provided fragments may be selected based on the quantization level.

The HTTP proxy may monitor the bandwidth being requested by each client and the bit rates of the next fragments to be provided for each requested video program to determine if the total bit rates of all fragments to be provided exceeds a bit rate of the fixed-bit-rate transmission channel. If the total bit rates exceed the bit rate of the fixed-bit-rate transmission channel, the HTTP proxy may provide fragments from a lower bit rate version for one or more of the requested video programs such that the next fragments to be provided fit within the fixed-bit-rate transmission channel. In order to determine which of the one or more requested programs fragments from the lower bit rate version should be selected from, the HTTP proxy may analyze each video program requested and chooses the one or more video programs based on a perceptual quality heuristic.

The present invention also includes apparatus for delivering video programs. In one example embodiment, an apparatus for providing video programs comprises means for providing a plurality of video programs in a fragmented, adaptive bit rate format, means for receiving, from each of a plurality of clients, a request for a respective video program from the plurality of video programs, and a multiplexer for multiplexing the requested video programs for delivery to the clients in a multiplex over a shared, fixed-bit-rate transmission channel.

The apparatus embodiments of the present invention may also include various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
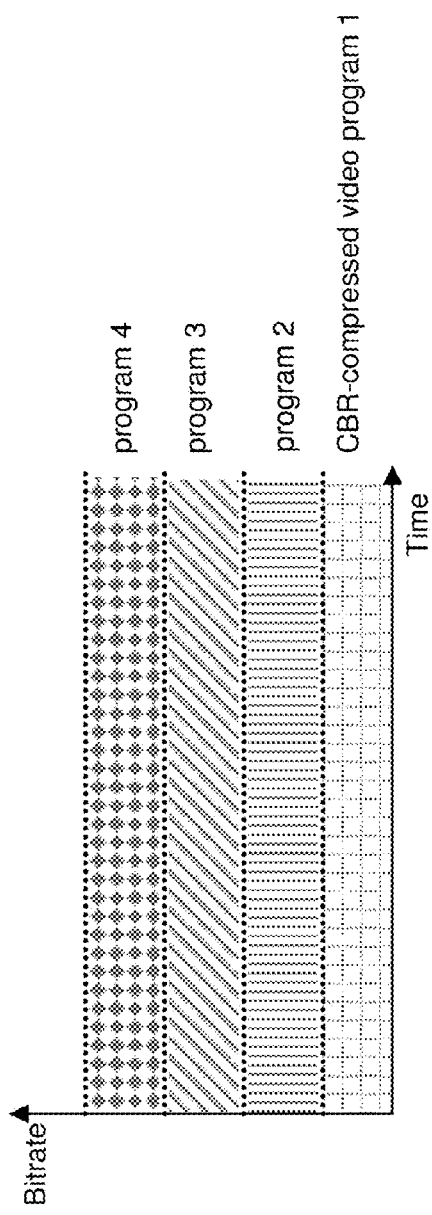
FIG. 1 shows an example of a prior art constant bit rate multiplex.
Figure 2:
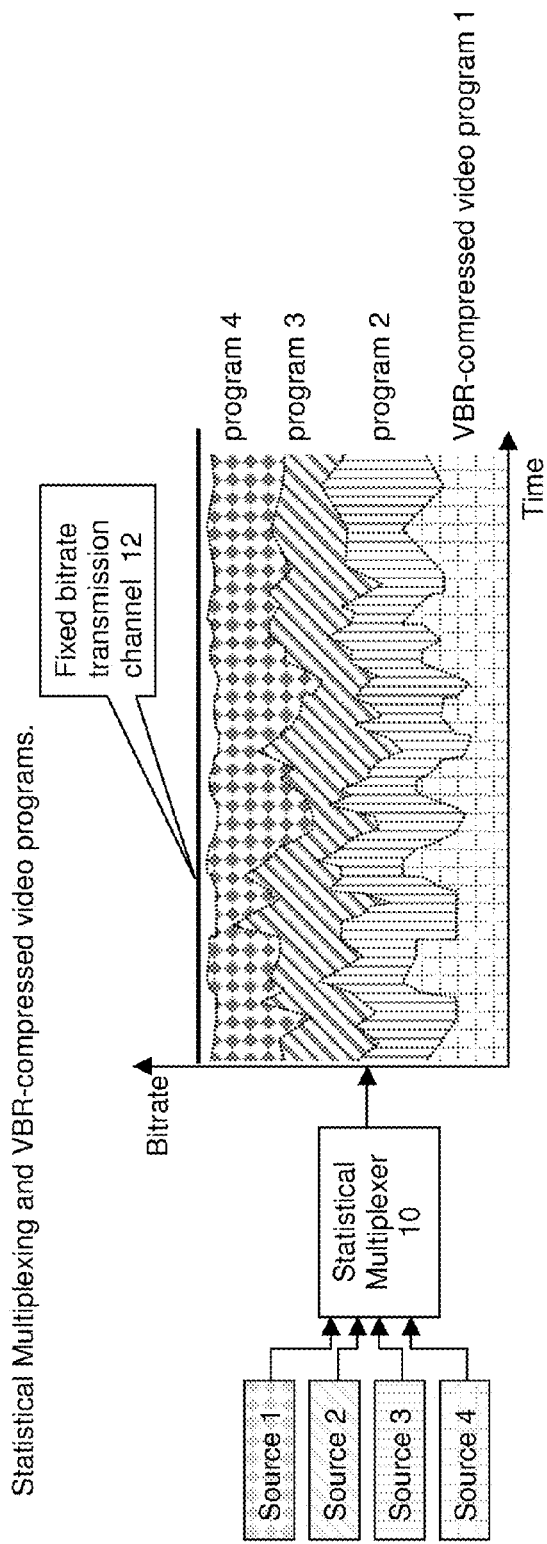
FIG. 2 shows a block diagram of prior art variable bit rate statistical multiplexing.
Figure 3:
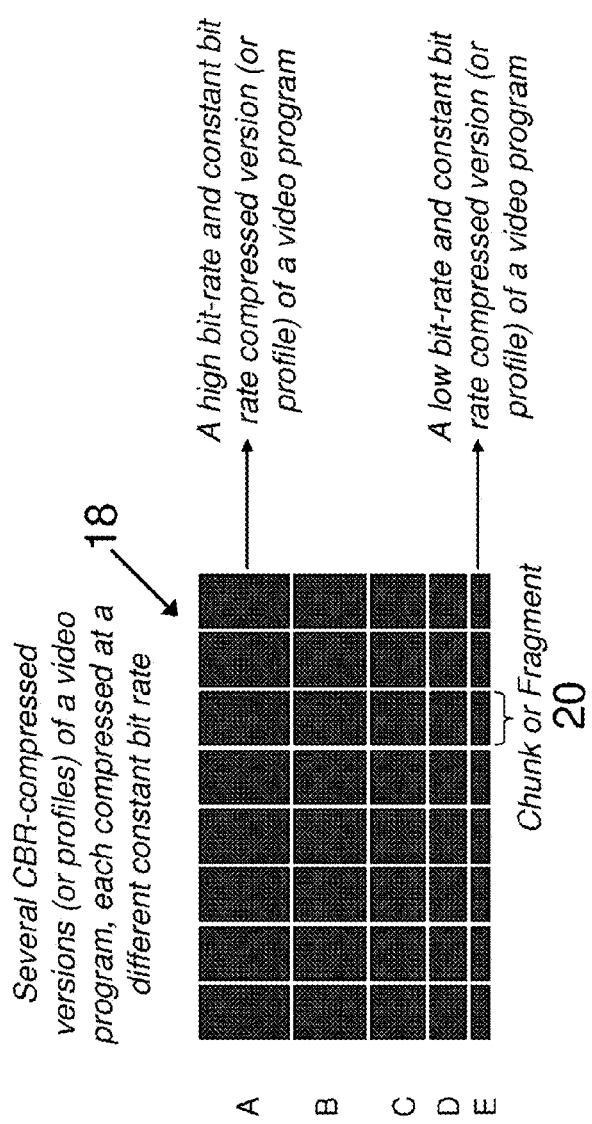
FIG. 3 shows an example of a prior art video program in an adaptive bit rate format.
Figure 4:
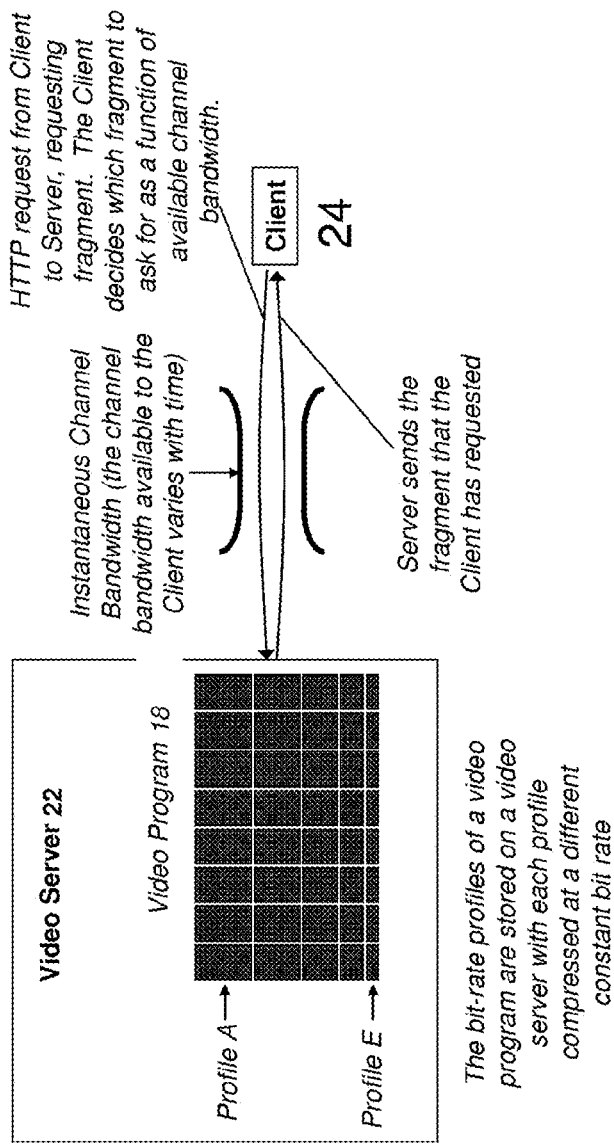
FIG. 4 shows a block diagram of video delivery in a prior art adaptive bit rate format.
Figure 5:
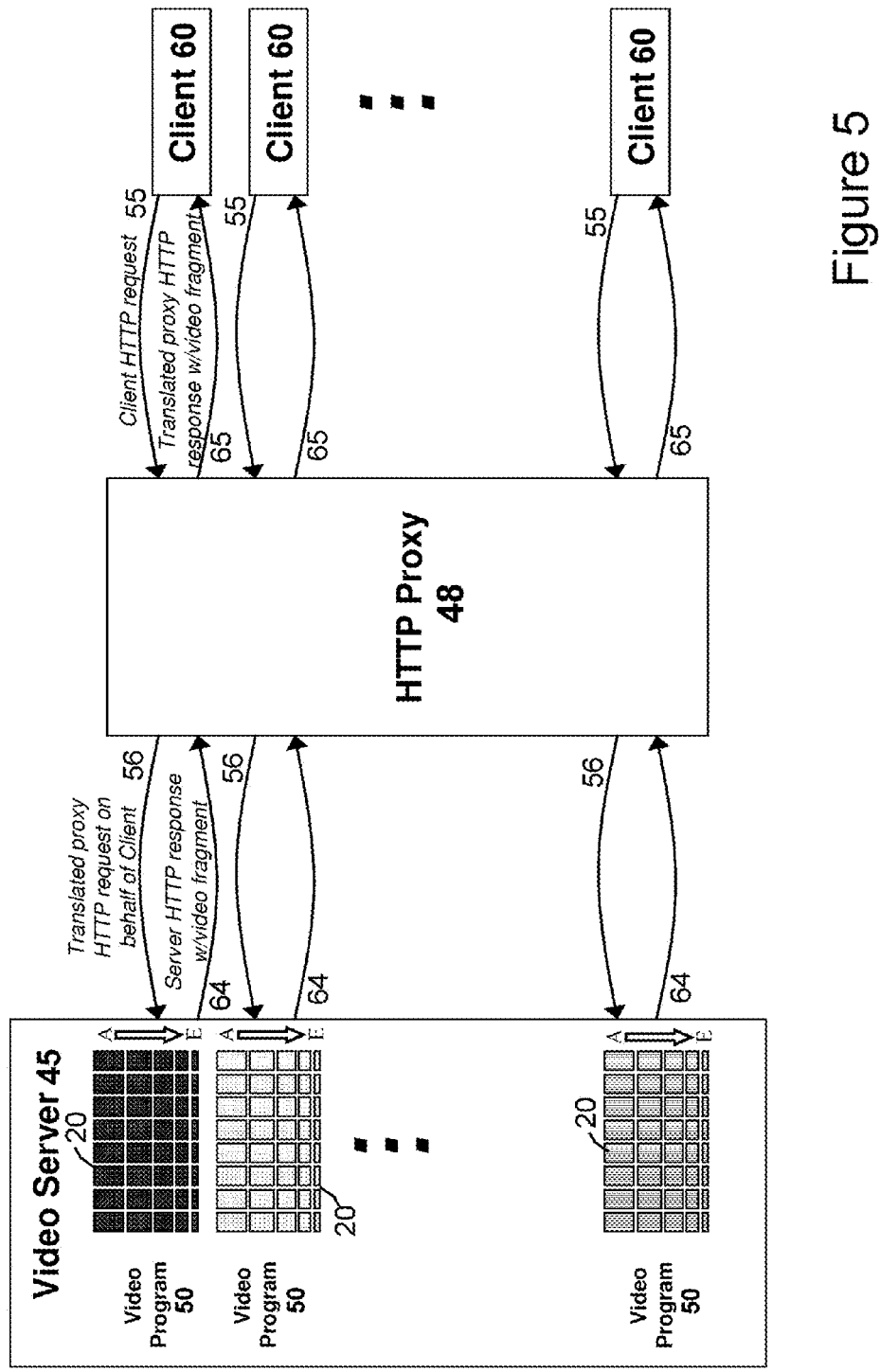
FIG. 5 shows a block diagram of a video delivery system in accordance with an example embodiment of the present invention.

FIG. 5 shows a block diagram of an example embodiment of the present invention for delivering video programs. A plurality of video programs 50 are provided in a fragmented, adaptive bit rate format. A request 55 for a respective video program 50 from the plurality of video programs is received from each of a plurality of clients 60. The requested video programs 50 are multiplexed for delivery to the clients in a multiplex over a shared, fixed-bit-rate transmission channel 65.

The fixed-bit-rate transmission channel can be a QAM channel (such as a 256-QAM channel) in a cable television network, a satellite transmission channel, a transmission channel in a mobile network, a DSL broadband connection, or the like.

The requests 55 may be for the same or different video programs 50. The requests 55 for the video programs 50 may occur at the same or at different times.

The video programs 50 may be stored on or provided via a server 45.

In the fragmented, adaptive bit rate format, several versions (e.g., versions A-E) of each video program 50 may be provided at correspondingly different bit rates. Each version A-E of each program may be divided into fragments 20. Although the present invention is described using versions A-E of the video programs 50, those skilled in the art will appreciate that a different number of versions may be provided to the same effect.

The server 45 may be an HTTP server. The client requests 55 may comprise HTTP requests for the fragments 20 of the respective video programs 50 requested by each of the clients 60.

In a further example embodiment, an HTTP proxy 48 may be provided for receiving the HTTP requests 55 from the clients 60. The HTTP proxy may then translate the client request 55 and forward the translated request 56 on to the video server 45. The video server will then select the appropriate video fragment 20 from the appropriate version A-E of the video program 50 and provide this fragment 20 to the HTTP proxy 48 in a response 64. The HTTP proxy 48, which may include statistical multiplexing capabilities, then provides the fragments 20 of the respective video programs 50 from the HTTP server 45 to the clients 60 in a multiplex over the fixed-bit-rate transmission channel 65. Alternatively, a separate multiplexer (not shown) may be provided which receives the fragments 20 from the HTTP proxy 48 for each of the clients 60 and assembles the multiplex for delivery over the fixed-bit-rate transmission channel to the clients 60.

The HTTP proxy 48 may be one of a script, service, or process running on the same device as the HTTP server 45 providing the video programs 50. Each request 55 may include an identification of the video program 50 requested and a desired bit rate for an initial or next fragment 20 of the requested video program 50. The HTTP proxy 48 may return at least one fragment 20 of the requested video program 50 to the client 60 at the desired bit rate or may return at least one fragment 20 with a different bit rate based on predetermined criteria. The predetermined criteria may comprise at least one of: a number or type of other video programs 50 are being requested in the same fixed-bit-rate transmission channel by other clients 60; an identity of the requesting client 60; a subscription plan of the requesting client 60; video quality levels of other video programs 50; a combined bandwidth being requested by all clients 60; a desired bandwidth or video quality set by a service provider providing the transmission channel; a predetermined fixed bit rate set by the service provider; and instantaneous bit rates of the other video programs 50, or the like.

In this manner, the HTTP Proxy 48 can manage the bandwidth given to each client 60 for their requested video program 50 based on what the video service provider wants to achieve, instead of based upon the singular view that an individual client 60 has of the bandwidth available to it.

For each client 60 and the respective requested video program 50: each request 55 may result in the receipt of at least one fragment 20 of the video program 50; subsequent requests 55 may be sent by the client 60 and processed by the HTTP proxy 48 after receipt of a prior request 55; and a bit rate of subsequent received fragments 20 may be dependent on one of the corresponding request 55, the bit rate of a prior received fragment 20, or the predetermined criteria.

The client 60 may comprise one of an end user or a content distribution network. In the event the HTTP proxy 48 delivers the fragment 20 with a different bit rate than requested, the HTTP proxy 48 may include information specifying a change in the bit rate of the delivered fragment 20.

Figure 6:
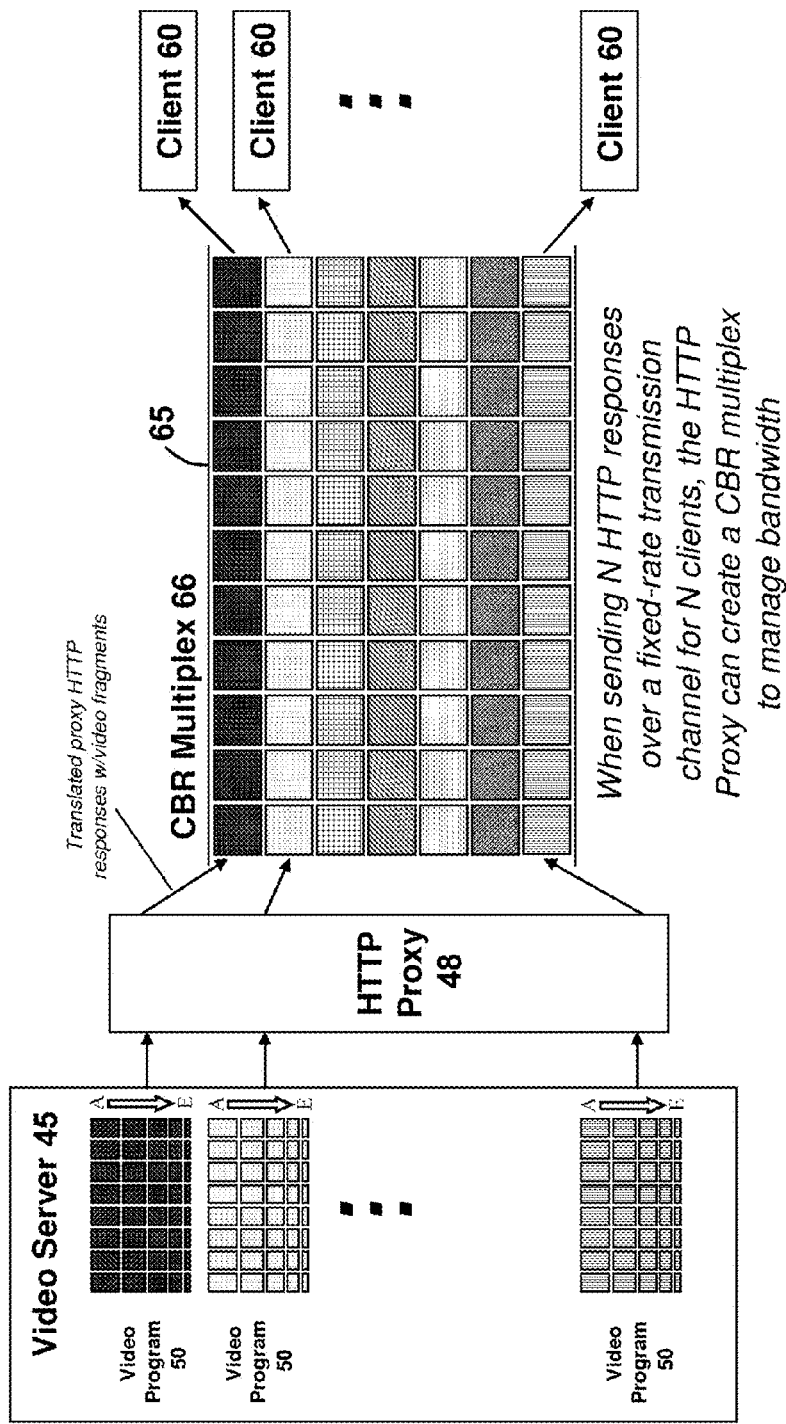
FIG. 6 shows a block diagram of statistical multiplexing to form a constant bit rate multiplex in an adaptive bit rate environment in accordance with an example embodiment of the present invention.

In a further example embodiment of the present invention as shown in FIG. 6, the multiplex may comprise a constant bit rate multiplex 66. For each client 60 and the respective requested video program 50: each request 50 may result in the receipt of at least one fragment 20 of the video program 50; subsequent requests may be sent by the client 60 and processed by the HTTP proxy 48 after receipt by the client 60 of a prior request 55 until the entire video program 50 or a desired portion of the video program 50 is received; each fragment 20 of the respective video program 50 may be selected from one version A-E of the video program 50 and provided at the corresponding bit rate.

In other words, in a constant bit rate embodiment, for each client 60, fragments 20 will be provided to that client 60 only from a single version A-E of its requested program 50 (irregardless of any requested bit rate). For example, a first client 60 will receive only fragments 20 from version C of a program 50 in response to all requests 55 for that program, while a second client 60 will receive only fragments 20 from a version B of its requested program (which may be the same or different than the program requested by the first client 60). Thus, the program 50 is provided to each client in fragments at a constant bit rate, creating a CBR multiplex 66.

The bit rate of the fragments 20 for each requested video program 50 may be set by a service provider so that all requested video programs 50 fit within the fixed-bit-rate transmission channel 65.

Figure 7:
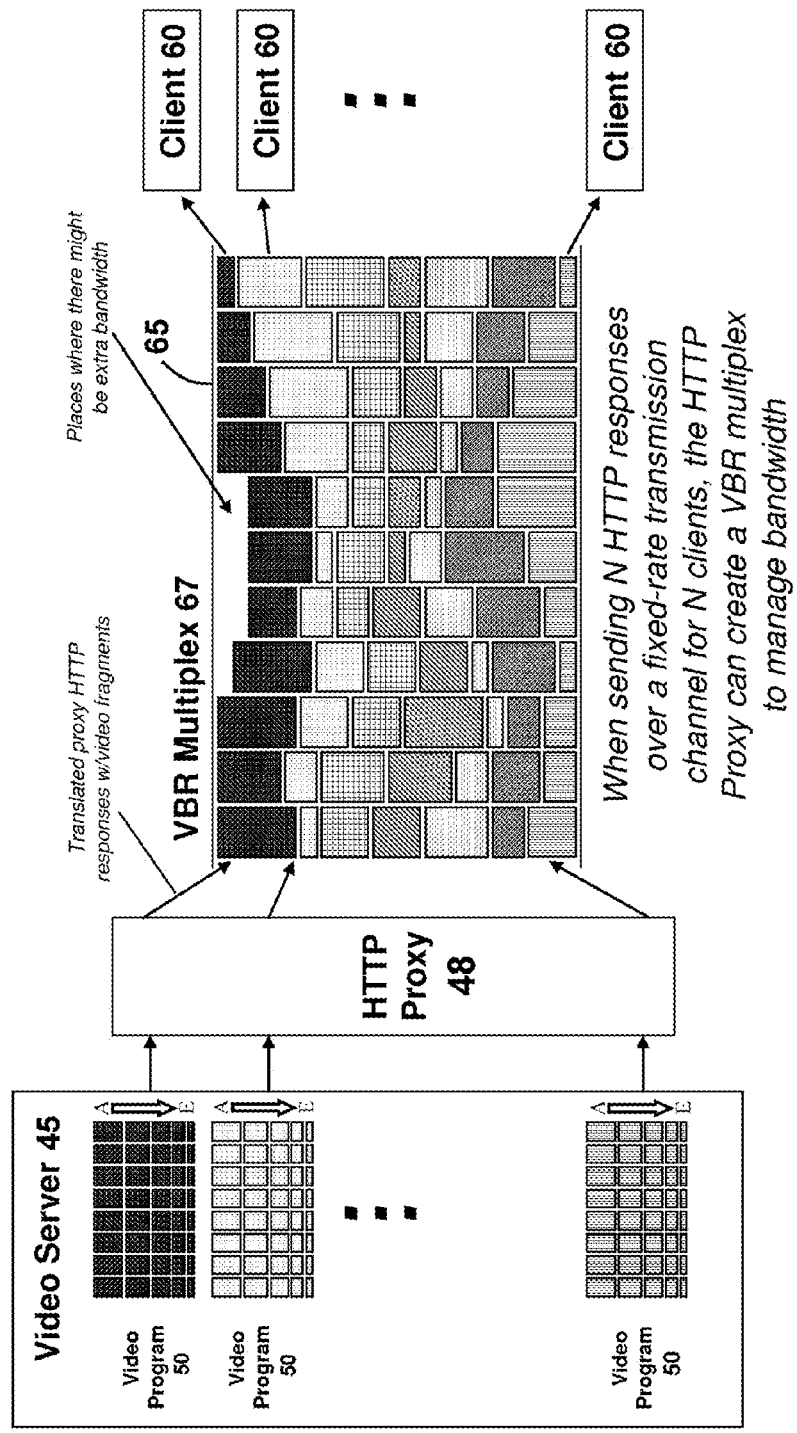
FIG. 7 shows a block diagram of statistical multiplexing to form a variable bit rate multiplex in an adaptive bit rate environment in accordance with an example embodiment of the present invention.

In another example embodiment of the present invention as shown in FIG. 7, the multiplex may comprise a variable bit rate multiplex 67. For each requested program 50, the HTTP proxy 48 may monitor a quantization level of the fragments 20 of each version A-E of the requested program 50, and in response to each request 55, the HTTP proxy 48 may deliver to the clients 60 fragments 20 taken from one or more of the versions A-E of each program 50 having the same or substantially the same quantization level. Each request 55 may be processed by the HTTP proxy 48 to determine when to provide a next fragment 20. Any indication of a desired bit rate contained in the client request 55 may be ignored by the HTTP proxy 48, as instead, with the variable bit rate embodiment, the bit rate of all provided fragments 20 may be selected from the different versions A-E of the video program 50 based on the quantization level.

Such a VBR approach maximizes the video quality for all clients 60 by giving each client 60 near constant picture quality by delivering to the clients a VBR version of each video program 50.

The HTTP proxy 48 may monitor the bandwidth being requested by each client 60 and the bit rates of the next fragments 20 to be provided for each requested video program 50 to determine if the total bit rates of all fragments 20 to be provided exceeds a bit rate of the fixed-bit-rate transmission channel 65. If the total bit rates exceed the bit rate of the fixed-bit-rate transmission channel 65, the HTTP proxy 48 may provide fragments 20 from a lower bit rate version for one or more of the requested video programs 50 such that the next fragments 20 to be provided fit within the fixed-bit-rate transmission channel 65. In order to determine which of the one or more requested programs 50 fragments 20 from the lower bit rate version A-E should be selected from, the HTTP proxy 48 may analyze each video program 50 requested and chooses the one or more video programs 50 based on a perceptual quality heuristic.

It should now be appreciated that the present invention provides advantageous methods and apparatus for video delivery using statistical multiplexing of video programs provided in an adaptive bit rate format.

Although the invention has been described in connection with various illustrated embodiments, numerous modifications and adaptations may be made thereto without departing from the spirit and scope of the invention as set forth in the claims.

What is claimed is:

1. A video delivery method, comprising:
providing, for each of a plurality of different video programs, several versions of the same content pre-encoded at correspondingly different bit rates in a fragmented, adaptive bit rate format;
receiving, from each of a plurality of clients, a request for a fragment of a respective video program from the plurality of different video programs;
selecting, in response to each request, the fragment from one of the versions of the respective video program identified in the request; and
multiplexing the selected fragments of the respective video programs selected from the plurality of different video programs for delivery to the clients in a constant bit rate multiplex over a shared, fixed-bit-rate transmission channel;
wherein:
for each client, the respective video program is delivered in successive fragments, each of the fragments being provided in response to a respective successive request from the client;
in response to each of the requests, the fragment is selected from one of the versions of the respective video program for the multiplexing based on predetermined criteria taking into account all current requests and parameters of the shared, fixed-bit-rate transmission channel.

2. The video delivery method of claim 1, wherein the requests are for a same respective video program or for different respective video programs.

3. The video delivery method of claim 1, wherein the requests for the respective video programs occur simultaneously or at different times.

4. The video delivery method of claim 1, wherein the plurality of video programs are stored on or provided via a server.

5. The video delivery method of claim 1, wherein:
the server is an HTTP server; and
the requests comprise HTTP requests for the fragments of the respective video programs requested by each of the clients.

6. The video delivery method of claim 5, further comprising:
providing an HTTP proxy for receiving the HTTP requests from the clients and for providing the fragments of the respective video programs from the HTTP server to the clients in the constant bit rate multiplex over the shared, fixed-bit-rate transmission channel.

7. The video delivery method of claim 6, wherein the HTTP proxy is one of a script, service, or process running on the same device as the HTTP server providing the video programs.

8. The video delivery method of claim 6, wherein each of the requests includes an identification of the respective video program requested and a desired bit rate for an initial or next fragment of the respective video program.

9. The video delivery method of claim 8, wherein:
the HTTP proxy returns at least one of the fragments of the respective video program to the client at the desired bit rate or returns at least one of the fragments with a different bit rate based on the predetermined criteria.

10. The video delivery method of claim 9, wherein the predetermined criteria comprises at least one of:
a number or type of other of the respective video programs that are being requested in the shared, fixed-bit-rate transmission channel by other of the plurality of clients;
an identity of the requesting client;
a subscription plan of the requesting client;
video quality levels of the other of the respective video programs being requested by the plurality of clients;
a combined bandwidth being requested by the plurality of clients;
a desired bandwidth or video quality set by a service provider providing the shared, fixed-bit-rate transmission channel;
a predetermined fixed bit rate set by the service provider; and
instantaneous bit rates of the other video programs.

11. The video delivery method of claim 9, wherein, for each of the plurality of clients and the respective video programs:
each of the requests results in the receipt of one of the fragments of the video program;
subsequent requests are sent by the client and processed by the HTTP proxy after receipt of a prior request; and
a bit rate of subsequent received fragments is dependent on one of a corresponding one of the requests, a bit rate of a prior received fragment, or the predetermined criteria.

12. The video delivery method of claim 9, wherein:
each of the plurality of clients comprises one of an end user or a content distribution network; and
in the event the HTTP proxy delivers the fragment with a different bit rate than requested, the HTTP proxy includes information specifying a change in the bit rate of the delivered fragment.

13. The video delivery method of claim 6, wherein, for each of the clients and the respective video programs:
each of the requests results in the receipt of one of the fragments of the video program;
subsequent requests are sent by the client and processed by the HTTP proxy after receipt by the client of a prior request until an entire video program or a desired portion of the video program is received; and
each of the fragments of the respective video program is selected from one of the versions of the video program and provided at a corresponding bit rate.

14. The video delivery method of claim 13, wherein the bit rate of the fragments for each respective video program is set by a service provider so that all respective video programs fit within the shared, fixed-bit-rate transmission channel.

15. The video delivery method of claim 6, wherein:
for each of the respective programs, the HTTP proxy monitors a quantization level of the fragments of each of the versions of the respective programs;
in response to each of the requests, the HTTP proxy delivers to the clients the fragment taken from one or more of the versions of each of the respective programs having a same or a different quantization level.

16. The video delivery method of claim 15, wherein:
each of the requests is processed by the HTTP proxy to determine when to provide a next fragment;
any indication of a desired bit rate contained in each of the requests is ignored by the HTTP proxy and instead the bit rate of all provided fragments are selected based on the quantization level.

17. The video delivery method of claim 6, wherein:
the HTTP proxy monitors the bandwidth being requested by each of the clients and the bit rates of next fragments to be provided for each of the respective video programs to determine if a total bit rate of all the fragments to be provided exceeds a bit rate of the fixed-bit-rate transmission channel;
if the total bit rate exceeds the bit rate of fixed-bit-rate transmission channel, the HTTP proxy will provide the fragment from a lower bit rate version for one or more of the respective video programs such that the next fragments to be provided fit within the fixed-bit-rate transmission channel.

18. The video delivery method of claim 17, wherein:
in order to determine which of the one or more respective programs the fragment from the lower bit rate version should be selected from, the HTTP proxy analyzes each of the respective video programs requested and chooses the one or more video programs based on a perceptual quality heuristic.

19. An apparatus for delivering video programs, comprising:
a video server for providing, for each of a plurality of different video programs, several versions of the same content pre-encoded at correspondingly different bit rates in a fragmented, adaptive bit rate format;
a proxy server for receiving, from each of a plurality of clients, a request for a fragment of a respective video program from the plurality of different video programs and for providing, in response to each request, the fragment selected from one of the versions of the respective video program content identified in the request; and
a multiplexer for multiplexing the selected fragments of the respective video programs selected from the plurality of different video programs for delivery to the clients in a constant bit rate multiplex over a shared, fixed-bit-rate transmission channel;
wherein:
for each client, the respective video program is delivered in successive fragments, each of the fragments being provided in response to a respective successive request from the client;
in response to each of the requests, the fragment is selected from one of the versions of the respective video program for the multiplexer based on predetermined criteria taking into account all current requests and parameters of the shared, fixed-bit-rate transmission channel.

20. The apparatus for delivering video programs of claim 19, wherein:
the video server is an HTTP server; and
the requests comprise HTTP requests for the fragments of the respective video programs requested by each of the clients.

21. The apparatus for delivering video programs of claim 20, wherein the proxy server is an HTTP proxy to receive the HTTP requests from the clients and for providing the fragments of the respective video programs from the HTTP server to the clients in the constant bit rate multiplex over the shared, fixed-bit-rate transmission channel.

22. A video delivery method, comprising:
providing, for each of a plurality of different video programs, several versions of the same content pre-encoded at correspondingly different bit rates in a fragmented, adaptive bit rate format;
receiving, from each of a plurality of clients, a request for a fragment of a respective video program from the plurality of different video programs;
selecting, in response to each request, the fragment from one of the versions of the respective video program identified in the request; and
multiplexing the selected fragments of the respective video programs selected from the plurality of different video programs for delivery to the clients in a multiplex over a shared, fixed-bit-rate transmission channel;
providing an HTTP proxy for receiving the HTTP requests from the clients and for providing the fragments of the respective video programs from the HTTP server to the clients in the multiplex over the shared, fixed-bit-rate transmission channel;
wherein:
for each client, the respective video program is delivered in successive fragments, each of the fragments being provided in response to a respective successive request from the client;
in response to each of the requests, the fragment is selected from one of the versions of the respective video program for the multiplexing based on predetermined criteria taking into account all current requests and parameters of the shared, fixed-bit-rate transmission channel; and
for each of the respective programs, the HTTP proxy monitors a quantization level of the fragments of each of the versions of the respective programs.

23. The video delivery method of claim 22, wherein:
the server is an HTTP server; and
the requests comprise HTTP requests for the fragments of the respective video programs requested by each of the clients.

24. The video delivery method of claim 23, further comprising:
providing an HTTP proxy for receiving the HTTP requests from the clients and for providing the fragments of the respective video programs from the HTTP server to the clients in the multiplex over the shared, fixed-bit-rate transmission channel.

25. An apparatus for delivering video programs, comprising:
a video server for providing, for each of a plurality of different video programs, several versions of the same content pre-encoded at correspondingly different bit rates in a fragmented, adaptive bit rate format;
a proxy server for receiving, from each of a plurality of clients, a request for a fragment of a respective video program from the plurality of different video programs and for providing, in response to each request, the fragment selected from one of the versions of the respective video program content identified in the request; and
a multiplexer for multiplexing the selected fragments of the respective video programs selected from the plurality of different video programs for delivery to the clients in a multiplex over a shared, fixed-bit-rate transmission channel;
wherein:
for each client, the respective video program is delivered in successive fragments, each of the fragments being provided in response to a respective successive request from the client;
in response to each of the requests, the fragment is selected from one of the versions of the respective video program for the multiplexer based on predetermined criteria taking into account all current requests and parameters of the shared, fixed-bit-rate transmission channel; and
for each of the respective programs, the monitoring a quantization level of the fragments of each of the versions of the respective programs.

26. The apparatus of claim 25, wherein:
the server is an HTTP server; and
the requests comprise HTTP requests for the fragments of the respective video programs requested by each of the clients.

27. The apparatus of claim 26, further comprising:
providing an HTTP proxy for receiving the HTTP requests from the clients and for providing the fragments of the respective video programs from the HTTP server to the clients in the multiplex over the shared, fixed-bit-rate transmission channel.

* * * * *